(12) United States Patent
Dabak et al.

(10) Patent No.: US 8,670,845 B2
(45) Date of Patent: Mar. 11, 2014

(54) SYSTEM AND METHOD FOR AUTOMATICALLY TUNING A VOLTAGE CONVERTER

(75) Inventors: Anand Ganesh Dabak, Plano, TX (US); Brent McDonald, Murphy, TX (US)

(73) Assignee: Texas Instruments Incorporated, Dallas, TX (US)

( * ) Notice: Subject to any disclaimer, the term of this patent is extended or adjusted under 35 U.S.C. 154(b) by 610 days.

(21) Appl. No.: 12/872,256

(22) Filed: Aug. 31, 2010

(65) Prior Publication Data

US 2011/0063881 A1 Mar. 17, 2011

Related U.S. Application Data

(60) Provisional application No. 61/242,068, filed on Sep. 14, 2009.

(51) Int. Cl.
*G05B 13/02* (2006.01)
(52) U.S. Cl.
USPC .......................................................... 700/55
(58) Field of Classification Search
USPC .......................................................... 700/55
See application file for complete search history.

(56) References Cited

U.S. PATENT DOCUMENTS

| | | | |
|---|---|---|---|
| 5,394,322 A * | 2/1995 | Hansen | 700/37 |
| 7,656,945 B1 * | 2/2010 | Warner et al. | 375/233 |
| 2004/0036999 A1 * | 2/2004 | Chrappan Soldavini et al. | 360/78.04 |
| 2004/0223558 A1 * | 11/2004 | Brown et al. | 375/296 |
| 2007/0112443 A1 * | 5/2007 | Latham et al. | 700/29 |
| 2009/0055149 A1 * | 2/2009 | Hayter et al. | 703/11 |
| 2010/0057223 A1 * | 3/2010 | Kelly | 700/33 |
| 2010/0131219 A1 * | 5/2010 | Kenly et al. | 702/64 |

* cited by examiner

*Primary Examiner* — Kimberly Wilson
(74) *Attorney, Agent, or Firm* — Steven A. Shaw; Wade James Brady, III; Frederick J. Telecky, Jr.

(57) ABSTRACT

A power converter system is provided, comprising a plant having a plant input and a plant output; and a plant identification filter that receives the plant input and the plant output, and estimates the values of poles and zeros of the plant, wherein the plant identification filter updates the estimates of the poles and zeros, based upon the plant input and the plant output, beginning from an initial state; and a rate at which the plant identification filter updates the estimates of the values of the poles and zeros is slower than a rate at which the plant input and the plant output are received by the plant identification filter.

11 Claims, 3 Drawing Sheets

SYSTEM AND METHOD FOR AUTOMATICALLY TUNING A VOLTAGE CONVERTER

CROSS-REFERENCE TO RELATED APPLICATIONS

This application claims the benefit of Provisional U.S. Application 61/242,068, filed 14 Sep. 2009, and is expressly incorporated herein by reference.

TECHNICAL FIELD

The technical field relates in general to voltage conversion systems, and more particularly to a system and method for identification of parameters of a voltage converter (also called a plant) and the automatic tuning of the plant.

BACKGROUND

Voltage conversion systems are used in situations where a voltage required and a voltage supplied are different. They are often used when a high voltage AC or DC power supply is provided, but a relatively lower voltage is needed. For example, a laptop battery might provide between 7 and 10 volts, while the circuitry within the laptop only needs a fraction of a volt. The voltage converter system acts to step down the voltage to the usable level.

A voltage conversion system generally includes a voltage converter (also called a plant) and a controller. In many voltage conversion systems, however, the controller is designed before it is known what kind of plant will be used. In some cases a given controller might be used for different plants throughout its life. For example, a consumer or a manufacturer might purchase or produce the controller and the plant separately and match the two as needed.

In such a case, the controller is generally designed assuming certain parameter values for the plant (e.g., inductance and capacitance values for elements within the plant). These are often represented by the poles and zeroes of the plant, i.e., the points on a Z-transform function of the plant where the Z-transform becomes infinity or zero, respectively. The poles and zeroes of a plant (or an assumption of these values) can be used as an indicator of system performance and stability under given conditions.

However, this kind of design process can often result in under-designing of the system in terms of: (a) the phase margin available for the system, which corresponds to the stability of the system, (b) the gain margin available to the system, which also corresponds to the stability of the system, (c) the settling time of the system to load transients, and (d) an effective O/P impedance of the system as seen from a load side. Without knowing exact parameters, the controller must be designed to handle a worst-case scenario.

Furthermore, even a perfectly balanced voltage converter system can degrade. Components in the plant will age, causing their parameters to drift over time. Thus, even with perfect knowledge of system components, it is often necessary to under-design the system to account for the aging of components in the plant.

As a result of this under-designing, conventional voltage conversion systems are generally less efficient and more wasteful than they need to be under most operating circumstances.

It would therefore be desirable to provide a device and method for automatically identifying plant parameters and automatically tuning (i.e., auto-tuning) a voltage conversion system. More particularly, it would be desirable to provide a controller device and related method that estimates the poles and zeroes of a plant.

SUMMARY

Embodiments described herein provide a system and method for passing imaging data to be sent between an analog front end and a digital front end in an imaging system. In particular, these embodiments apply to a system and method for compressing and decompressing imaging data.

Accordingly, a first disclosed embodiment described herein provides a power converter system, comprising: a plant having a plant input and a plant output; and a plant identification filter that receives the plant input and the plant output, and estimates the values of poles and zeros of the plant, wherein the plant identification filter updates the estimates of the poles and zeros, based upon the plant input and the plant output, beginning from an initial state; and a rate at which the plant identification filter updates the estimates of the values of the poles and zeros is slower than a rate at which the plant input and the plant output are received by the plant identification filter.

A second disclosed embodiment described herein provides a plant identification filter for estimating the values of poles and zeros of a plant, comprising: a plant reception element that receives, as a plant input, an input to the plant, and further receives, as a plant output, an output from the plant; and a plant identification element that updates the estimates of the poles and zeros, based upon the plant input and the plant output, beginning from an initial state, the rate at which the plant identification element updates the estimates of the values of the poles and zeros being slower than a rate at which the plant input and the plant output are received by the plant reception element.

A third disclosed embodiment described herein provides a method comprising: receiving, by a plant identification filter, as a plant input, an input to a plant, and further receiving, as a plant output, an output from the plant; updating estimates of poles and zeros of the plant, based upon the plant input and the plant output, beginning from an initial state, at a rate slower than a rate at which the plant input and the plant output are received by the plant identification filter.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

In overview, the present disclosure concerns a power converter system whose controller can automatically identify the plant (i.e., power converter) being used and can automatically estimate parameters for the plant, and adjust the operation of the controller accordingly. More specifically, it relates to a circuit and method for automatically estimating the poles and zeroes in a plant and forwarding these estimates to a plant controller.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

Power Converter Circuit

Figure 1:
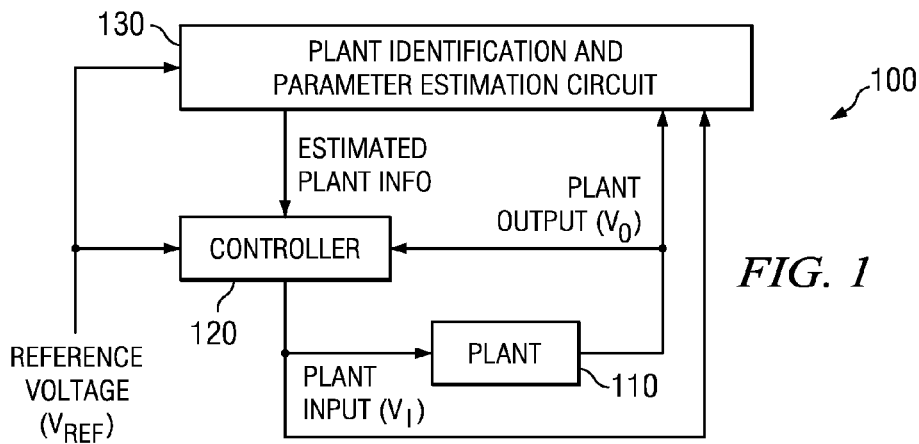
FIG. 1 is block diagram showing a power converter system according to disclosed embodiments.

FIG. 1 is block diagram showing a power converter system 100 according to disclosed embodiments. As shown in FIG. 1, the power converter circuit 100 includes a plant 110, a controller 120, and a plant identification and parameter estimation circuit 130.

The plant 110 is a voltage converter circuit that converts a plant input voltage $V_I$ to a plant output voltage $V_O$. The plant 110 will generally include some integrated circuitry, an inductive element, a capacitive element and a load. In one exemplary embodiment, the plant 110 can be a DC/DC buck converter. However, this is by way of example only. In alternate embodiments the plant 110 can be a different kind of voltage converter.

The controller 120 controls the operation of the plant 110. It provides the plant input voltage $V_I$ based on a reference voltage $V_{REF}$, estimated plant information, and the plant output voltage $V_O$. The reference voltage $V_{REF}$ will typically be the default plant input voltage $V_I$ for the system, e.g., a constant supply voltage received from a battery (not shown) or an external power line (not shown). Thus, by considering the estimated plant information and the plant output voltage $V_O$, the controller 120 can adjust the plant input voltage $V_I$ so that it is more appropriate to the exact plant 110 that it is connected to. Moreover, it can do this continually and automatically.

The plant identification and parameter estimation circuit 130 receives the reference voltage $V_{REF}$, the plant input voltage $V_I$, and the plant output voltage $V_O$, and based on these input signals, generates the estimated plant information. In disclosed embodiments the plant identification and parameter estimation circuit 130 filters and decimates the plant input voltage $V_I$, and the plant output voltage $V_O$, and passes the decimated voltages to a plant identification filter (e.g., a Kalman filter) to produce the estimated plant information, as will be described in more detail below with respect to FIG. 4.

Figure 2:
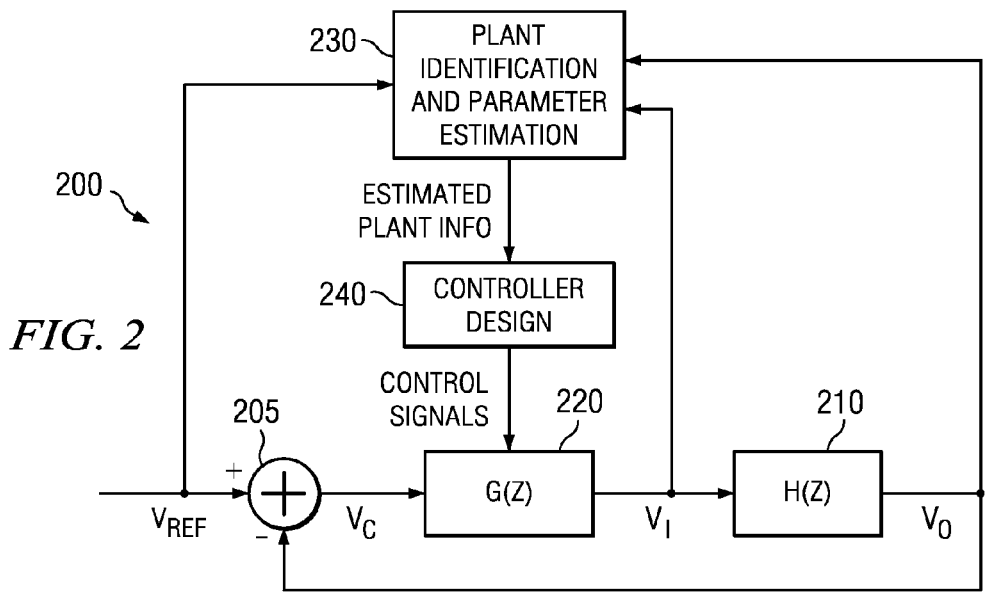
FIG. 2 is a control theory block diagram of power converter system of FIG. 1 according to disclosed embodiments.

FIG. 2 is a control theory block diagram 200 of the power converter system of FIG. 1 according to disclosed embodiments. As shown in FIG. 2, the control theory block diagram 200 includes a subtractor 205, a plant function 210, a controller function 220, a plant identification and parameter estimation function 230, and a controller design function 240.

The subtractor 205 subtracts the plant output voltage $V_O$ from the reference voltage $V_{REF}$ to produce a control voltage $V_C$. The functionality of the subtractor 205 in this embodiment is within the controller 120 of FIG. 1, thought it could be moved elsewhere in alternate embodiments.

The plant function 210 is represented by the function H(Z), which identifies how the plant 110 converts the plant input voltage $V_I$ to the plant output voltage $V_O$. If H(Z) is modeled as a second order infinite input response (IIR) filter system, then it can be written as a Z-transform function as follows:

$$H(Z) = \frac{a_0 + \alpha_1 Z^{-1} + \alpha_2 Z^{-2}}{1 + \beta_1 Z + \beta_2 Z^{-2}} = \frac{a_0(z^{-1} - a_1)(z^{-1} - a_2)}{(z^{-1} - b_1)(z^{-1} - b_2)} \quad (1)$$

where $a_0$, $a_1$, and $a_2$ are the zeroes of the plant 110 and $b_1$ and $b_2$ are the poles of the plant 110.

The controller function 220 is represented by the function G(Z), which identifies how the controller 120 converts the control voltage $V_O$ to the plant input voltage $V_I$.

The plant identification and parameter estimation function 230 receives the plant input voltage $V_I$ and the plant output voltage $V_O$, and uses these two voltages to generate the estimated plant information. This information provides an estimation of the poles and zeroes ($a_0$, $a_1$, $a_2$, $b_1$, and $b_2$) in the plant function 210 H(Z).

The controller design function 240 uses the estimated plant information to design the controller function 220 G(Z) using known control system design rules. In this way, the controller design function 240 can set the parameters of the controller function 220 G(Z) such that it takes into account the poles and zeroes in the plant function 210 H(Z). The functionality of the controller design function 240 in this embodiment is within the controller 120 of FIG. 1. However, in alternate embodiments the functionality of the controller design function 240 could be within the plant identification and parameter estimation circuit 130, and the plant identification and parameter estimation circuit 130 could provide the controller 120 with control signals rather than estimated plant information.

Figure 3:
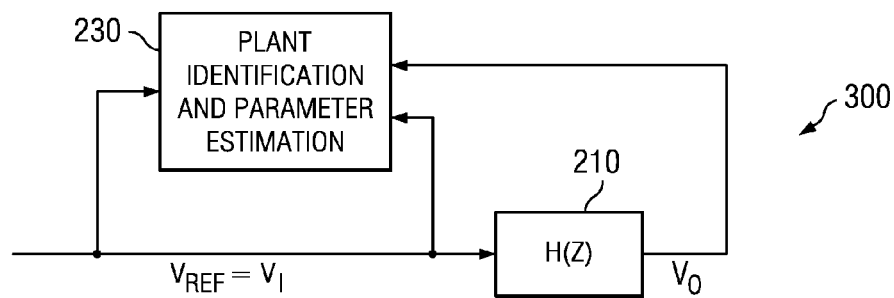
FIG. 3 is a control theory block diagram of the power converter system of FIG. 1 at initial system setup according to disclosed embodiments.

FIG. 3 is a control theory block diagram 300 of the power converter system of FIG. 1 at initial system setup according to disclosed embodiments. As shown in FIG. 3, during initial system setup in this disclosed embodiment, the controller 120 provides the reference voltage $V_{REF}$ as the plant input voltage $V_I$. Therefore, for the purposes of considering operation during initial system setup, the control theory block diagram 300 can be simplified to include just the plant function 210 H(Z) and the plant identification and parameter estimation function 230.

During initial system setup, the controller function 220 G(Z), the subtractor 205, and the controller design function 240 can all be omitted from the control theory block diagram 300. At this particular point in time, the controller function 220 G(Z), is equal to 1, meaning it passes the control voltage $V_C$ unchanged. The plant output voltage $V_O$ is zero to begin with, so the subtractor 205 will simply be subtracting 0 from the reference voltage $V_{REF}$ to generate the control voltage $V_C$, meaning that $V_C = V_{REF}$. And the plant identification and parameter estimation function 230 hasn't had time to generate any estimated plant information for the controller design function 240 to work with.

As shown in FIGS. 2 and 3, the plant identification and estimation function 230 thus operates in a recursive least square (RLS) operation to identify the plant and estimate its parameters. A more detailed analysis of the plant identification and parameter estimation function 230 is provided below with respect to FIGS. 4 and 5.

Plant Identification and Parameter Estimation Circuit

Figure 4:
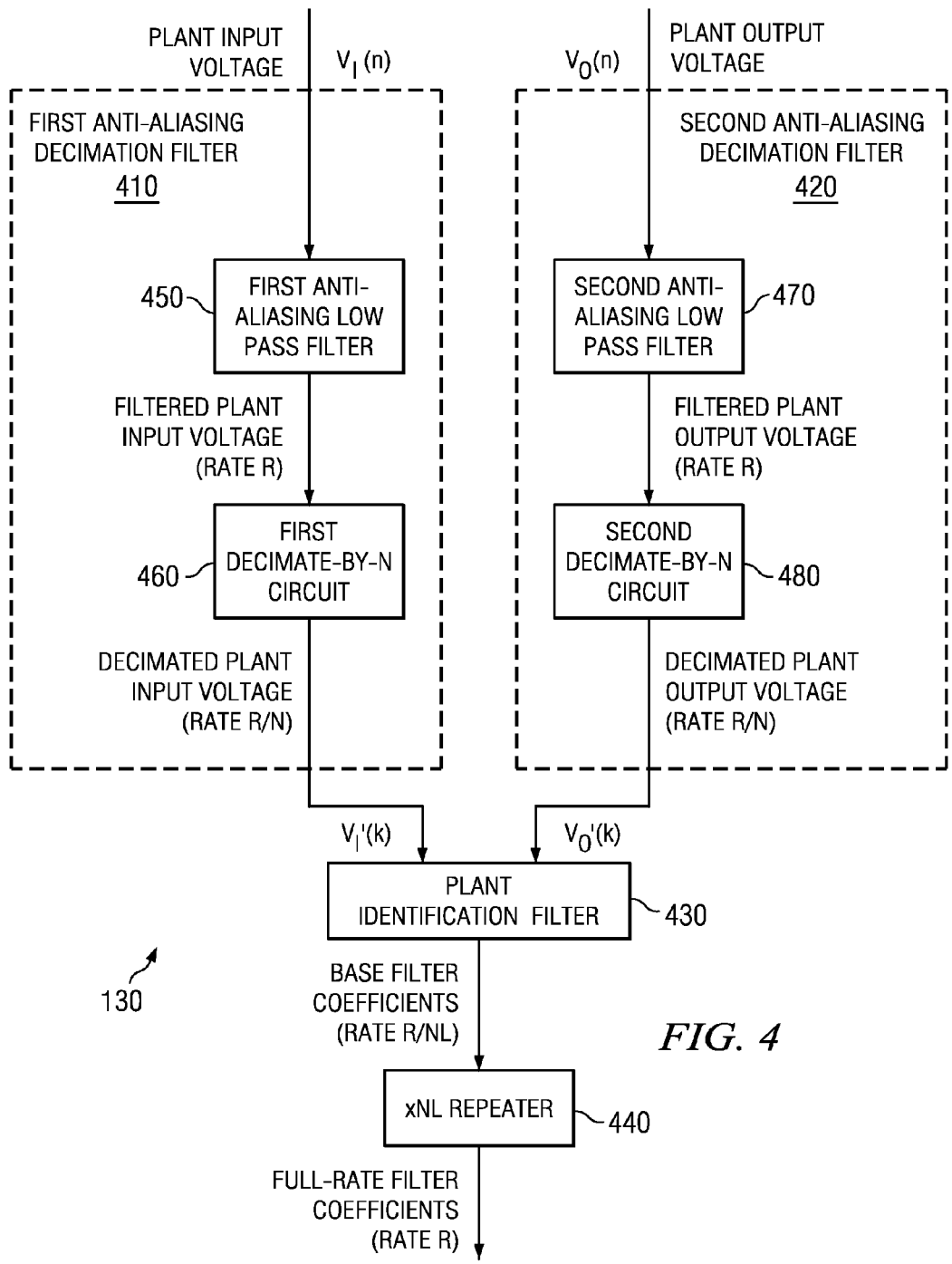
FIG. 4 is a block diagram of the plant identification and parameter estimation circuit of FIG. 1 according to disclosed embodiments.

FIG. 4 is a block diagram of the plant identification and parameter estimation circuit 130 of FIG. 1 according to disclosed embodiments. As shown in FIG. 4, the plant identification and parameter estimation circuit 130 includes a first anti-aliasing decimation filter 410, a second anti-aliasing decimation filter 420, a plant identification filter 430, and a xNL repeater 440. The first anti-aliasing decimation filter 410 includes a first anti-aliasing low pass filter 450 and a first decimate-by-N circuit 460. The second anti-aliasing decimation filter 420 includes a second anti-aliasing low pass filter 470 and a second decimate-by-N circuit 480.

The first anti-aliasing decimation filter 410 receives the plant input voltage $V_I(n)$, filters it at a sampling rate of R, and then decimates the resulting filtered voltage by N to generate a decimated plant input voltage $V'_I(k)$ at a rate of R/N. More specifically, in the disclosed embodiments the first anti-aliasing low pass filter 450 performs a low pass anti-aliasing filtering operation on the input plant voltage $V_I(n)$ to generate a filtered plant input voltage at a rate of R. And the first decimate-by-N circuit 460 decimates the filtered plant input voltage by N (i.e., it passes only every $N^{th}$ sample) to generate the decimated plant input voltage $V'_I(k)$ at a rate of R/N.

The second anti-aliasing decimation filter 420 receives the plant output voltage $V_O(n)$, filters it at a sampling rate of R, and then decimates the resulting filtered voltage by N to generate a decimated plant output voltage $V'_O(k)$ at a rate of R/N. More specifically, in the disclosed embodiments the second anti-aliasing low pass filter 470 performs a low pass anti-aliasing filtering operation on the output plant voltage $V_O(n)$ to generate a filtered plant output voltage at a rate of R. And the second decimate-by-N circuit 480 decimates the filtered plant output voltage by N (i.e., it passes only every $N^{th}$ sample) to generate the decimated plant output voltage $V'_O(k)$ at a rate of R/N.

The plant identification filter 430 performs a filtering operation on the decimated plant input voltage $V'_I(k)$ and the decimated plant output voltage $V'_O(k)$ at a rate L times slower than the first and second anti-aliasing decimation filters 410 and 420 to generate a set of base filter coefficients at a rate of R/NL. In the disclosed embodiments the plant identification filter 430 is a Kalman filter. However, in alternate embodiments any suitable filter that can estimate parameters of the plant 110 based on the plant input voltage $V_I$ and the plant output voltage $V_O$ may be used.

In the disclosed embodiments the operation of the plant identification filter 430 can be described by the following equations:

$$\hat{\theta}(k) = \hat{\theta}(k-1) + K(k-1)\left(V'_O(k) - \bar{\varphi}^T(k)\hat{\theta}(k-1)\right) \quad (2)$$

$$K(k-1) = P(k-1)\bar{\varphi}(l)(l + \bar{\varphi}^T(k)P(k-1)\bar{\varphi}(k))^{-1} \quad (3)$$

$$P(k) = (I - K(k)\bar{\varphi}^T(k))P(k-1) \quad (4)$$

$$\bar{\varphi}(k) = \begin{bmatrix} V'_I(k-1) \\ V'_I(k-2) \\ V'_O(k-1) \\ V'_O(k-2) \end{bmatrix} \quad (5)$$

where $\hat{\theta}(k)$ represents a matrix of the base filter coefficients, $V'_O(k)$ represents the decimated plant output voltage, $\bar{\varphi}(k)$ represents a matrix of the decimated plant input and output voltages $V'_I(k)$ and $V'_O(k)$, and P(k) represents the covariance matrix. The xNL repeater 440 operates to repeat each sample of the base filter coefficients N·L times to generate full-rate filter coefficients at a rate of R.

TABLE 1

| Sampling Rate ($R_s$) | Plant Poles | Decimation Rate (N) | Decimation Filter Output Rate | Reduction Factor (L) | Kalman Filter Output Rate |
|---|---|---|---|---|---|
| 1 MHz | ~20 kHz | 8 | 125 kHz | 8 | 15.625 kHz |
| 1 MHz | ~15 kHz | 8 | 125 kHz | 8 | 15.625 kHz |
| 1 MHz | ~10 kHz | 16 | 62.5 kHz | 4 | 15.625 kHz |
| 1 MHz | ~2 kHz | 32 | 31.25 kHz | 2 | 15.625 kHz |
| 1 MHz | ~20 kHz | 8 | 125 kHz | 16 | 7.8125 kHz |
| 1 MHz | ~15 kHz | 8 | 125 kHz | 16 | 7.8125 kHz |
| 1 MHz | ~10 kHz | 16 | 62.5 kHz | 8 | 7.8125 kHz |
| 1 MHz | ~2 kHz | 32 | 31.25 kHz | 4 | 7.8125 kHz |

In the disclosed embodiments the values for N and L can be determined by trial and error. Since N and L are typically single- or double-digit integers, and may often be powers of two, such an effort should not require undue experimentation. Table 1 shows a some exemplary values for a few disclosed embodiments. In these embodiments the plant identification filter 430 is a Kalman filter.

Slowing down the output of the first and second anti-aliasing decimation filters 410 and 420 and the output of the plant identification filter 430 provides a couple of important advantages. First, slowing down the plant identification filter 430 reduces its cost and complexity, and thus reduces the cost and complexity of the entire controller 120.

Second, the slower filtering operations provide for better system parameters. Using pole-zero mapping:

$$z = e^{sT} \quad (6)$$

where $$T = \frac{1}{R}.$$

Thus, for a given analog pole location P, as R becomes larger the equivalent digital poles will tend to get closer to the unit circle. Keeping R low keeps the equivalent digital poles farther from the unit circle, which can improve system performance.

Of course, there will be a limit to how much decimation can be done, because at some point aliasing of the system characteristic will occur hence the decimation cannot be arbitrarily low. Thus, there are maximum effective values for N and L. The exact maximum effective values will vary depending upon the details of the system. But they should be clearly evident to one of skill in the art without undue experimentation.

In addition, there may not be a single parameter for N and L that is good from the performance and complexity perspective over the entire potential range of operation. Therefore, some embodiments of an plant identification and parameter estimation circuit 130 may run through several combinations of N and L to make a good estimate of the pole/zeros of the plant 110.

Method of Plant Identification and Parameter Estimation

Figure 5:
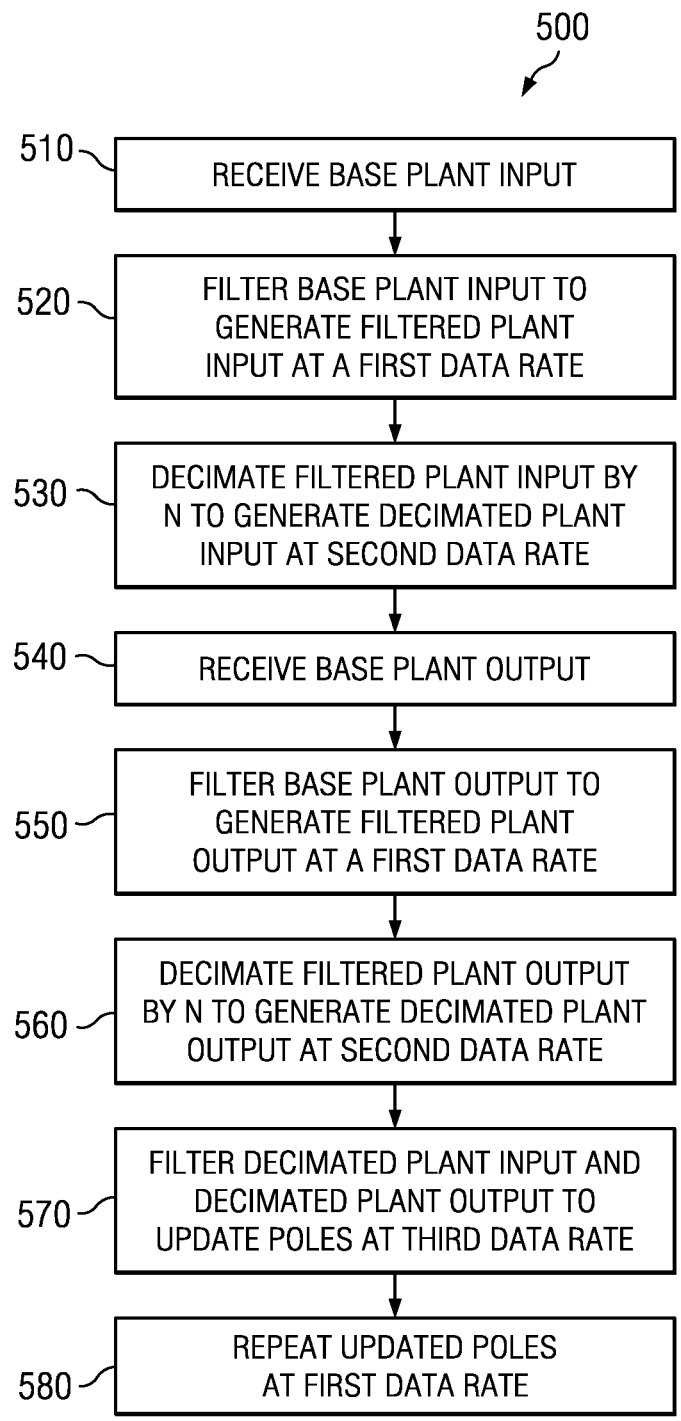
FIG. 5 is a flow chart showing a plant identification and parameter estimation operation according to disclosed embodiments.

FIG. 5 is a flow chart showing a plant identification and parameter estimation operation according to disclosed embodiments. As shown in FIG. 5, the operation 500 begins by receiving a base plant input voltage. (510) The base plant input voltage is a voltage that is provided to a plant circuit, such as a voltage converter.

The base plant input voltage is then filtered at a first data rate R to generate a filtered plant input voltage. (520) In the disclosed embodiment, this filtering is anti-aliasing low pass filtering, though other filtering is possible in alternate embodiments.

The filtered plant input voltage is then decimated by an integer N to generate a decimated plant input at a second data rate that is $(1/N)^{th}$ the first data rate. (530)

Operation continues by receiving a base plant output voltage. (540) The base plant output voltage is a voltage that is output from the plant circuit (i.e., the converted voltage).

The base plant output voltage is then filtered at a first data rate R to generate a filtered plant output voltage. (550) As with the base plant input voltage filtering, in the disclosed embodiment, the base plant output filtering is also anti-aliasing low pass filtering, though other filtering is possible in alternate embodiments.

The filtered plant output voltage is then decimated by the integer N to generate a decimated plant output at a second data rate that is $(1/N)^{th}$ the first data rate. (560)

The filtered plant input voltage and the filtered plant output voltage are then filtered at a third data rate that is $(1/L)^{th}$ the second data rate to update a set of estimated poles and zeroes. (570) In the disclosed embodiments this filtering is Kalman filtering. However, in alternate embodiments and suitable filtering that can be used to predict or estimate a parameter of the plant can be used.

Finally, the information regarding the updated poles and zeroes is repeated at the first data rate. (580) This is accomplished by repeating each element of the updated poles and zeroes L times.

Once the updated poles and zeroes are output, they can be used in a later operation to adjust the operation of a method or device that controls the operation of the plant that received the base plant input voltage and provided the base plant output voltage.

Conclusion

This disclosure is intended to explain how to fashion and use embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A power converter system, comprising:
   a plant having a plant input and a plant output;
   a plant identification filter circuit hardware that receives the plant input and the plant output, and estimates values of poles and zeros of the plant, comprising:
      a Kalman filter;
      a pair of anti-aliasing, low-pass filters connected in series with the Kalman filter the first of the pair of anti-aliasing, low-pass filters receives the plant input, decimates the plant input by a second integer factor, and outputs the decimated plant input to the Kalman filter, and the second of the pair of anti-aliasing, low-pass filters receives the plant output, decimates the plant output by the second integer factor, and outputs the decimated plant output to the Kalman filter, wherein the plant identification filter circuit hardware updates the estimates of the values of the poles and zeros, based upon the plant input and the plant output, beginning from an initial state, a rate at which the plant identification filter updates the estimates of the values of the poles and zeros is slower than a rate at which the plant input and the plant output are received by the plant identification filter, wherein the Kalman filter updates the estimates of the values of the poles and zeros by determining Kalman coefficients using recursive least squares on the plant input and the plant output, and the rate at which the Kalman filter updates the estimates of the values of the poles and zeros is slower than the rate at which the plant input and the plant output are received by a first integer factor, wherein the first integer factor is set to a first particular integer and the second integer factor is set to second particular integer,
   if a maximum of the updated estimates of the values of the zeros and poles is less than a predetermined low zero-pole threshold that is based on the rate at which the plant input and the plant output are received by the first of the pair of anti-aliasing, low-pass filters and the second of the pair of anti-aliasing, low-pass filters, respectively, the second integer factor is reset to an integer that is greater than the second particular integer and the first integer factor is reset to an integer that is less than the first particular integer,
   if a maximum of the updated estimates of the values of the zeros and poles is greater than a predetermined high zero-pole threshold that is based on the rate at which the plant input and the plant output are received by the first of the pair of anti-aliasing, low-pass filters and the second of the pair of anti-aliasing, low-pass filters, respectively, the second integer factor is reset to an integer that is less than the second particular integer and the first integer factor is reset to an integer that is greater than the first particular integer,
   if a maximum of the updated estimates of the values of the zeros and poles is neither less than the predetermined low zero-pole threshold nor greater than the predetermined high zero-pole threshold, the second integer factor remains set at the second particular integer and the first integer factor remains set at the first particular integer, and if a maximum of the updated estimates of the values of the zeros and poles is either less than the low zero-pole threshold or greater than the high zero-pole threshold, the first of the pair of anti-aliasing, low-pass filters receives the plant input, decimates the plant input by the second integer factor as reset, and outputs the decimated plant input to the Kalman filter, and the second of the pair of anti-aliasing, low-pass filters receives the plant output, decimates the plant output by the second integer factor as reset, and outputs the decimated plant output to the Kalman filter, the rate at which the Kalman filter updates the estimates of the values of the poles and zeros is slower than the rate at which the plant input and the plant output are received by the first integer factor as reset.

2. The power converter system according to claim 1, wherein the predetermined low zero-pole threshold is 10% of the rate at which the plant input and the plant output are received by the plant identification filter, and the predetermined high zero-pole threshold is 50% of the rate at which the plant input and the plant output are received by the plant identification filter.

3. The power converter system according to claim 2, wherein the rate at which the plant input and the plant output are received by the plant identification filter is 1 MHz, the first particular integer is 8 and the second particular integer is 16, the integer that is greater than the second particular integer is 32 and the integer that is less than the first particular integer is 4, the integer that is less than the second particular integer is 8 and the integer that is greater than the first particular integer is 16.

4. The power converter system according to claim 1, wherein the plant is a Buck converter plant, including one or more passive devices that apply an output voltage to a load, one or more transistors that, by being turned on or off, regulate an input voltage to the one or more passive devices, the plant output is the output voltage, and the plant input is an input voltage that effects whether each of the one or more transistors is turned on or off.

5. A plant identification filter circuit for estimating the values of poles and zeros of a plant, comprising:

a plant reception circuitry that receives, as a plant input, an input to the plant, and further receives, as a plant output, an output from the plant; and a plant identification circuitry that updates the estimates of the values of the poles and zeros, based upon the plant input and the plant output, beginning from an initial state, the rate at which the plant identification circuitry updates the estimates of the values of the poles and zeros being slower than a rate at which the plant input and the plant output are received by the plant reception circuitry, the plant identification circuitry comprising:

a Kalman filter which updates the estimates of the values of the poles and zeros by determining Kalman coefficients using recursive least squares on the plant input and the plant output and the rate at which the Kalman filter updates the estimates of the values of the poles and zeros is slower than the rate at which the plant input and the plant output are received by a first integer factor;

a pair of anti-aliasing, low-pass filters connected in series with the Kalman filter, the first of the pair of anti-aliasing, low-pass filters receives the plant input, decimates the plant input by a second integer factor, and outputs the decimated plant input to the Kalman filter, and the second of the pair of anti-aliasing, low-pass filters receives the plant output, decimates the plant output by the second integer factor, and outputs the decimated plant output to the Kalman filter, wherein the first integer factor is set to a first particular integer and the second integer factor is set to second particular integer, if a maximum of the updated estimates of the values of the zeros and poles is less than a predetermined low zero-pole threshold that is based on the rate at which the plant input and the plant output are received by the first of the pair of anti-aliasing, low-pass filters and the second of the pair of anti-aliasing, low-pass filters, respectively, the second integer factor is reset to an integer that is greater than the second particular integer and the first integer factor is reset to an integer that is less than the first particular integer, if a maximum of the updated estimates of the values of the zeros and poles is greater than a predetermined high zero-pole threshold that is based on the rate at which the plant input and the plant output are received by the first of the pair of anti-aliasing, low-pass filters and the second of the pair of anti-aliasing, low-pass filters, respectively, the second integer factor is reset to an integer that is less than the second particular integer and the first integer factor is reset to an integer that is greater than the first particular integer, if a maximum of the updated estimates of the values of the zeros and poles is neither less than the predetermined low zero-pole threshold nor greater than the predetermined high zero-pole threshold, the second integer factor remains set at the second particular integer and the first integer factor remains set at the first particular integer, and if a maximum of the updated estimates of the values of the zeros and poles is either less than the low zero-pole threshold or greater than the high zero-pole threshold, the first of the pair of anti-aliasing, low-pass filters receives the plant input, decimates the plant input by the second integer factor as reset, and outputs the decimated plant input to the Kalman filter, and the second of the pair of anti-aliasing, low-pass filters receives the plant output, decimates the plant output by the second integer factor as reset, and outputs the decimated plant output to the Kalman filter, the rate at which the Kalman filter updates the estimates of the values of the poles and zeros is slower than the rate at which the plant input and the plant output are received by the first integer factor as reset.

6. The plant identification filter circuit according to claim 5, wherein the predetermined low zero-pole threshold is 10% of the rate at which the plant input and the plant output are received by the first of the pair of anti-aliasing, low-pass filters and the second of the pair of anti-aliasing, low-pass filters, respectively the predetermined high zero-pole threshold is 50% of the rate at which the plant input and the plant output are received by the first of the pair of anti-aliasing, low-pass filters and the second of the pair of anti-aliasing, low-pass filters, respectively.

7. The plant identification filter circuit according to claim 6, wherein
the rate at which the plant input and the plant output are received by the first of the pair of anti-aliasing, low-pass filters and the second of the pair of anti- aliasing, low-pass filters, respectively, is 1 MHz,
the first particular integer is 8 and the second particular integer is 16,
the integer that is greater than the second particular integer is 32 and the integer that is less than the first particular integer is 4,
the integer that is less than the second particular integer is 8 and the integer that is greater than the first particular integer is 16.

8. A method comprising:
receiving, by a plant identification filter, as a plant input, an input to a plant, and further receiving, as a plant output, an output from the plant;
updating by a Kalman filter in the plant identification filter estimates of values of poles and zeros by determining Kalman coefficients using recursive least squares on the plant input and the plant output, the rate at which the Kalman filter updates the estimates of the values of the poles and zeros is slower than the rate at which the plant input and the plant output are received by a first integer factor;
a pair of anti-aliasing, low-pass filters are connected in series with the Kalman filter, the first of the pair of anti-aliasing, low-pass filters receives the plant input, decimates the plant input by a second integer factor, and outputs the decimated plant input to the Kalman filter, and
the second of the pair of anti-aliasing, low-pass filters receives the plant output, decimates the plant output by the second integer factor, and outputs the decimated plant output to the Kalman filter, wherein
the first integer factor is set to a first particular integer and the second integer factor is set to second particular integer,
if a maximum of the updated estimates of the values of the zeros and poles is less than a predetermined low zero-pole threshold that is based on the rate at which the plant input and the plant output are received by the first of the pair of anti-aliasing, low-pass filters and the second of the pair of anti-aliasing, low-pass filters, respectively, the second integer factor is reset to an integer that is greater than the second particular integer and the first integer factor is reset to an integer that is less than the first particular integer,
if a maximum of the updated estimates of the values of the zeros and poles is greater than a predetermined high zero-pole threshold that is based on the rate at which the plant input and the plant output are received by the first of the pair of anti-aliasing, low-pass filters and the second of the pair of anti- aliasing, low-pass filters, respectively, the second integer factor is reset to an integer that is less than the second particular integer and the first integer factor is reset to an integer that is greater than the first particular integer,
if a maximum of the updated estimates of the values of the zeros and poles is neither less than the predetermined low zero-pole threshold nor greater than the predetermined high zero-pole threshold, the second integer factor remains set at the second particular integer and the first integer factor remains set at the first particular integer, and
if a maximum of the updated estimates of the values of the zeros and poles is either less than the low zero-pole threshold or greater than the high zero-pole threshold,
the first of the pair of anti-aliasing, low-pass filters receives the plant input, decimates the plant input by the second integer factor as reset, and outputs the decimated plant input to the Kalman filter, and
the second of the pair of anti-aliasing, low-pass filters receives the plant output, decimates the plant output by the second integer factor as reset, and outputs the decimated plant output to the Kalman filter,
the rate at which the Kalman filter updates the estimates of the values of the poles and zeros is slower than the rate at which the plant input and the plant output are received by the first integer factor as reset.

9. The method according to claim 8, wherein
the predetermined low zero-pole threshold is 10% of the rate at which the plant input and the plant output are received by the first of the pair of anti-aliasing, low-pass filters and the second of the pair of anti-aliasing, low-pass filters, respectively, and
the predetermined high zero-pole threshold is 50% of the rate at which the plant input and the plant output are received by the first of the pair of anti-aliasing, low-pass filters and the second of the pair of anti-aliasing, low-pass filters, respectively.

10. The method according to claim 9, wherein
the rate at which the plant input and the plant output are received by the first of the pair of anti-aliasing, low-pass filters and the second of the pair of anti-aliasing, low-pass filters, respectively, is 1 MHz,
the first particular integer is 8 and the second particular integer is 16,
the integer that is greater than the second particular integer is 32 and the integer that is less than the first particular integer is 4,
the integer that is less than the second particular integer is 8 and the integer that is greater than the first particular integer is 16.

11. The method according to claim 8, wherein
the plant is a Buck converter plant, including
one or more passive devices that apply an output voltage to a load,
one or more transistors that, by being turned on or off, regulate an input voltage to the one or more passive devices,
the plant output is the output voltage, and
the plant input is an input voltage that effects whether each of the one or more transistors is turned on or off.

* * * * *